(12) United States Patent
Nilsson et al.

(10) Patent No.: US 12,254,751 B2
(45) Date of Patent: Mar. 18, 2025

(54) MASKING OF OBJECTS IN A VIDEO STREAM

(71) Applicant: Axis AB, Lund (SE)

(72) Inventors: Tor Nilsson, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 20 days.

(21) Appl. No.: 17/831,499

(22) Filed: Jun. 3, 2022

(65) Prior Publication Data

US 2023/0017325 A1    Jan. 19, 2023

(30) Foreign Application Priority Data

Jul. 19, 2021    (EP) .................................... 21186486

(51) Int. Cl.
| | |
|---|---|
| *G08B 13/196* | (2006.01) |
| *G06T 7/194* | (2017.01) |
| *G06V 20/52* | (2022.01) |
| *G11B 27/031* | (2006.01) |

(52) U.S. Cl.
CPC ........ *G08B 13/19602* (2013.01); *G06T 7/194* (2017.01); *G06V 20/52* (2022.01); *G08B 13/19678* (2013.01); *G11B 27/031* (2013.01)

(58) Field of Classification Search
CPC ........ G08B 13/19602; G08B 13/19678; G06T 7/194; G06T 5/004; G06T 5/20; G06T 7/11; G06T 2207/10016; G06V 20/52; G06V 10/26; G11B 27/031; H04N 21/4318; H04N 21/44008
See application file for complete search history.

(56) References Cited

U.S. PATENT DOCUMENTS

| | | | |
|---|---|---|---|
| 8,823,798 B2 * | 9/2014 | Bernal .................... | G06V 20/52 |
| | | | 348/149 |
| 11,036,998 B2 * | 6/2021 | Lee .......................... | H04N 23/61 |
| 2005/0276446 A1 * | 12/2005 | Chen ........................ | G06V 10/28 |
| | | | 382/173 |
| 2006/0083440 A1 * | 4/2006 | Chen ..................... | H04N 23/698 |
| | | | 382/284 |
| 2009/0310822 A1 | 12/2009 | Chang et al. | |

(Continued)

OTHER PUBLICATIONS

Extended European Search Report dated Feb. 1, 2022 for European Patent Application No. 21186486.3.

(Continued)

*Primary Examiner* — Gelek W Topgyal
(74) *Attorney, Agent, or Firm* — Volpe Koenig (57) ABSTRACT

A method for masking of objects in a video stream, the method comprising: acquiring a video stream; detecting an object in the video stream; determining whether the detected object belongs to a foreground of the video stream indicative of moving objects or to a background of the video stream indicative of static objects; classifying the detected object to be of a specific type using a first classifier if the detected object is determined to belong to the foreground, and using a second classifier if the detected object is determined to belong to the background, the first classifier being different from the second classifier, and if the detected object is classified as being of the specific type of object, masking the object in the video stream.

18 Claims, 8 Drawing Sheets

(56) References Cited

U.S. PATENT DOCUMENTS

| | | | |
|---|---|---|---|
| 2012/0327172 A1* | 12/2012 | El-Saban | G06T 7/174 |
| | | | 348/14.02 |
| 2013/0170760 A1* | 7/2013 | Wang | G06V 20/52 |
| | | | 382/224 |
| 2017/0344835 A1* | 11/2017 | Singh | G06V 10/811 |
| 2018/0197294 A1* | 7/2018 | Pan | G06T 7/194 |
| 2018/0284872 A1* | 10/2018 | Schluessler | G06F 1/3265 |
| 2019/0114804 A1* | 4/2019 | Sundaresan | G06T 7/74 |
| 2019/0251364 A1* | 8/2019 | Park | G06V 20/47 |
| 2019/0304102 A1 | 10/2019 | Chen et al. | |
| 2021/0192816 A1* | 6/2021 | Watanabe | G06V 20/40 |
| 2021/0217179 A1* | 7/2021 | Li | G06T 7/11 |
| 2022/0122431 A1* | 4/2022 | Barton | G06T 7/80 |
| 2022/0129685 A1* | 4/2022 | Gummadi | G06T 7/194 |
| 2022/0148426 A1* | 5/2022 | Longardner | G08G 1/142 |
| 2022/0198671 A1* | 6/2022 | Price | G06N 3/045 |
| 2022/0333933 A1* | 10/2022 | Ma | G01C 21/3407 |

OTHER PUBLICATIONS

Martinez et al., "A convolutional neural network approach to parking monitoring in urban radar sensing," 2017 European Radar Conference (EURAD), pp. 86-89 (2017).

Ding et al., "Vision-based Edge-line Assisted Moving Vehicle Detection," 2020 IEEE International Conference on Mechatronics and Automation (ICMA), pp. 1107-1111 (2020).

Ghedia et al., "Performance Evaluation of Moving Object Detection and Tracking Algorithm for Outdoor Surveillance Using Modified GMM." International Journal of Engineering Sciences & Research Technology, 6(7), 215-223. (2017).

ELHarrouss et al., "Moving objects detection based on thresholding operations for video surveillance systems," 2015 IEEE/ACS 12th International Conference of Computer Systems and Applications (AICCSA), pp. 1-5 (2015).

* cited by examiner

MASKING OF OBJECTS IN A VIDEO STREAM

FIELD OF INVENTION

The present disclosure generally relates to the field of camera surveillance, and in particular to a method and control unit for masking of objects in a video stream.

TECHNICAL BACKGROUND

In various camera surveillance applications, it is sometimes necessary to mask objects in a video stream captured by a camera. Important reasons for object masking are to ensure privacy for people that show up in the video stream and to protect other types of personal information that may be captured in the video stream.

As an example, object detection may be used for detecting vehicles. Masking of the vehicles, or perhaps more importantly, the license plates or people in the vehicle, may be performed by extracting the image coordinates of the relevant parts of the object. Once the image coordinates are known, the relevant parts in the video stream can be masked or pixelated.

However, moving objects, such as vehicles, can be difficult to detect with high reliability, especially at high speeds such as on highways. In such cases, object detection and classification risk failing and, consequently, relevant objects risk not being masked.

Accordingly, there is room for improvement regarding masking of objects in a video stream.

SUMMARY

In view of above-mentioned and other drawbacks of the prior art, the present system provides an improved method for masking of objects in a video stream that alleviates at least some of the drawbacks of prior art.

According to a first aspect, it is therefore provided a method for masking of objects in a video stream.

The method comprises the following steps: acquiring a video stream; detecting an object in the video stream; determining whether the detected object belongs to a foreground of the video stream indicative of moving objects or a background of the video stream indicative of static objects; classifying the detected object to be of a specific type using a first classifier if the detected object is determined to belong to the foreground, and using a second classifier if the detected object is determined to belong to the background, the first classifier being different from the second classifier, and if the detected object is classified as being of the specific type of object, masking the object in the video stream.

The present disclosure utilizes different classifiers depending on whether the object belongs to the foreground or to the background of the video stream. The foreground is the part or segment of the video stream that comprises the moving objects and the background is the part or segment of the video stream that comprises the static objects. By the provision of two different classifiers, it is possible to tailor the classifiers to the different types of characteristics of objects in the different segments, i.e., background or the foreground. More precisely, the first classifier may be specifically configured to performed object classification in the foreground and the second classifier may be specifically configured to performed object classification in the background. Thus, the classifiers need not be effective or accurate in the other one of the background and the foreground.

The method may comprise a step of segmenting the video stream into a background and a foreground, i.e., into a background segment and a foreground segment. Such segmentation may be performed by extracting the pixel data from pixels in each frame of the video stream that indicates moving objects and use that data to construct the foreground. Pixel data from pixels in each frame of the video stream that indicates static objects are used for constructing the background.

Subsequent to the segmentation it may be determined whether the object belongs to the background segment or to the foreground segment, i.e., whether the object is found or detected in the background segment or in the foreground segment.

Thus, determining whether the object belongs to the background or to the foreground may comprise segmenting the video stream into a background and a foreground, wherein, subsequent to the segmentation, the object is determined to belong to background or the foreground.

Masking an object in the video stream is to pixelate or in other ways cover or black out the pixels that are desirable to mask.

In one embodiment, the computational complexity of the first classifier is lower than the computational complexity of the second classifier.

This advantageously provides for a first classifier that is faster than the second classifier. A fast classifier may be less accurate than a slow classifier. However, in order to detect a fast-moving object in the foreground, a faster classifier is preferred despite somewhat lower accuracy. Especially since for privacy purposes a certain amount of false positives is acceptable. A size of a neural network of the first classifier may be smaller than the size of a neural network of the second classifier, if the classifiers are neural networks.

In one embodiment, the second classifier may be configured to perform classification on fewer frames per time unit of the video stream than that of the first classifier. Since the second classifier is used for classifying objects in the background segment of the video stream where static objects are detected there is no need for a high frame rate. In other words, static objects do not move and thus it is sufficient with a lower frame rate for detecting object in the background. To the contrary, in the foreground segment where moving objects are expected, a higher frame rate is needed. Thus, a slower but more accurate classification can be performed by the second classifier, and a fast but less accurate classification is performed by the first classifier. This is one advantageous way of tailoring the classifiers for their specific task of object classification in the same video stream but in different segments.

In one embodiment, the second classifier may be configured to perform classification only on nonconsecutive time frames of the video stream. Advantageously, since only static objects are expected to be classified by the second classifier, there is no need to perform classification on every frame. To enable the use of a more accurate classifier that need for processing time, only nonconsecutive time frames, preferably occurring at regular time intervals of the video stream may be classified by the second classifier. Such nonconsecutive time frames may be for example every 5th, 10th, 15th, 20th, or 25th time frame.

In one embodiment, the first classifier may be configured to classify moving objects and the second classifier being configured to classify static objects. Thus, the first classifier may have been trained using only video streams with moving objects and the second classifier may have been trained using video streams with only static objects.

A neural network provides for an efficient tool for classification. Various types of neural networks adapted to perform classification are conceivable and known per se. Example suitable neural networks are a recurrent neural network and a convolutional neural network. A recurrent neural network is especially efficient for capturing temporal evolutions.

Further, other suitable classifiers may be decision tree classifiers such as random forest classifiers that are efficient for classification. In addition, classifiers such as support vector machine classifiers and logistic regression classifiers are also conceivable.

In addition, the classifier may be a statistical classifier, a heuristic classifier, a fuzzy logic classifier. Further, it is also feasible to use a table, i.e., a look-up table with combinations of data.

According to a second aspect, there is provided a method for masking of objects in a video stream, the method comprising the following steps: acquiring a video stream; detecting an object in the video stream; determining whether the detected object belongs to a foreground of the video stream indicative of moving objects or a background of the video stream indicative of static objects; classifying the detected object to be of a specific type using a lower classification threshold if the detected object is determined to belong to the foreground, than if the object is determined to belong to the background, if the detected object is classified as being of the specific type of object, masking the object in the video stream.

This second aspect uses different thresholds in the classifier depending on whether the object belongs to the foreground or background of the video stream. The foreground is the part or segment of the video stream that comprises the moving objects and the background is the part or segment of the video stream that comprises the static object. By the provision of a lower threshold for what is acceptable as an object of the specific type provides for reducing the amount of objects of the specific type that are not masked, although the amount of false positives may increase. For a privacy critical scene this is not an issue. It is more important that all objects of the specific type are masked. For the background segment, the threshold is maintained higher since the background region of static objects are easier to classify within. Lowering the classification threshold in the foreground segment increases the probability of correctly classifying all the objects of the specific type even if it is moving fast.

The method may comprise a step of segmenting the video stream into a background and a foreground, i.e., into a background segment and a foreground segment. Such segmentation may be performed by extracting the pixel data from pixels in each frame of the video stream that indicates moving objects and use that data to construct the foreground. Pixel data from pixels in each frame of the video stream that indicates static objects are used for constructing the background.

Subsequent to the segmentation it may be determined whether the object belongs to the background segment or to the foreground segment, i.e., whether the object is found or detected in the background segment or in the foreground segment.

In embodiments, the method may comprise: if the detected object is determined to belong to the foreground, determining the speed of the detected object; and selecting a classification threshold depending on the speed of the detected object, and wherein the detected object is classified using the selected classification threshold. In this way, the threshold may be tailored to the speed of the object so that an appropriate threshold is used. The threshold should be selected so that the specific type of object is correctly classified with low levels of missed classifications, i.e., false negatives to ensure that even if the object is moving very fast, a specific type of object is detected and classified.

In one example embodiment, the threshold may be selected by the following procedure. If the speed of the object exceeds a speed threshold, classifying the object using a classifier with a first classification threshold, and if the speed of the object is below the speed threshold, classifying the object using a the classifier with a second classification threshold that is higher than the first classification threshold. This advantageously provides a straightforward speed thresholding for selecting the classification threshold. The speed threshold may be fixed.

In one possible embodiment, a speed exceeding the speed threshold indicates that the object is moving and a speed below the speed threshold indicates a static object. In other words, the speed threshold may be zero.

In some embodiments, the classification threshold is a function of the object speed. In other words, instead of a fixed threshold, the threshold is selected as a function of the object speed, e.g., as a sliding threshold that is adaptively set. This advantageously provides for more accurately set thresholds and consequently to improved classification results.

In embodiments, the method may comprise classifying objects in the foreground set of frames and in the background set of frames, and masking each object classified as being of the specific type of object. In other words, it should be ensured that all classified objects of the specific type in both the foreground and in the background are masked in order to ensure privacy.

In some possible implementations, the specific type of object may be a vehicle.

According to a third aspect, there is provided a control unit configured to perform the steps of any one of the herein described aspects and embodiments.

Further embodiments of, and effects obtained through this third aspect of the present disclosure are largely analogous to those described above for the first aspect and the second aspect.

According to a fourth aspect, there is provided a system comprising an image capturing device configured to capture a video stream, and a control unit according to the third aspect.

Further embodiments of, and effects obtained through this fourth aspect are largely analogous to those described above for the first aspect, the second aspect, and the third aspect.

According to a fifth aspect, there is provided computer program comprising instructions which, when the program is executed by a computer, cause the computer to carry out the method of any of the herein discussed embodiments.

Further embodiments of, and effects obtained through this fifth aspect of the present disclosure are largely analogous to those described above for the other aspects.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

The present concepts will now be described more fully hereinafter with reference to the accompanying drawings, in which currently preferred embodiments are shown. The concepts may, however, be embodied in many different forms and should not be construed as limited to the embodiments set forth herein; rather, these embodiments are provided for thoroughness and completeness, and fully convey the scope of the concepts to the skilled person. Like reference characters refer to like elements throughout.

Figure 1:
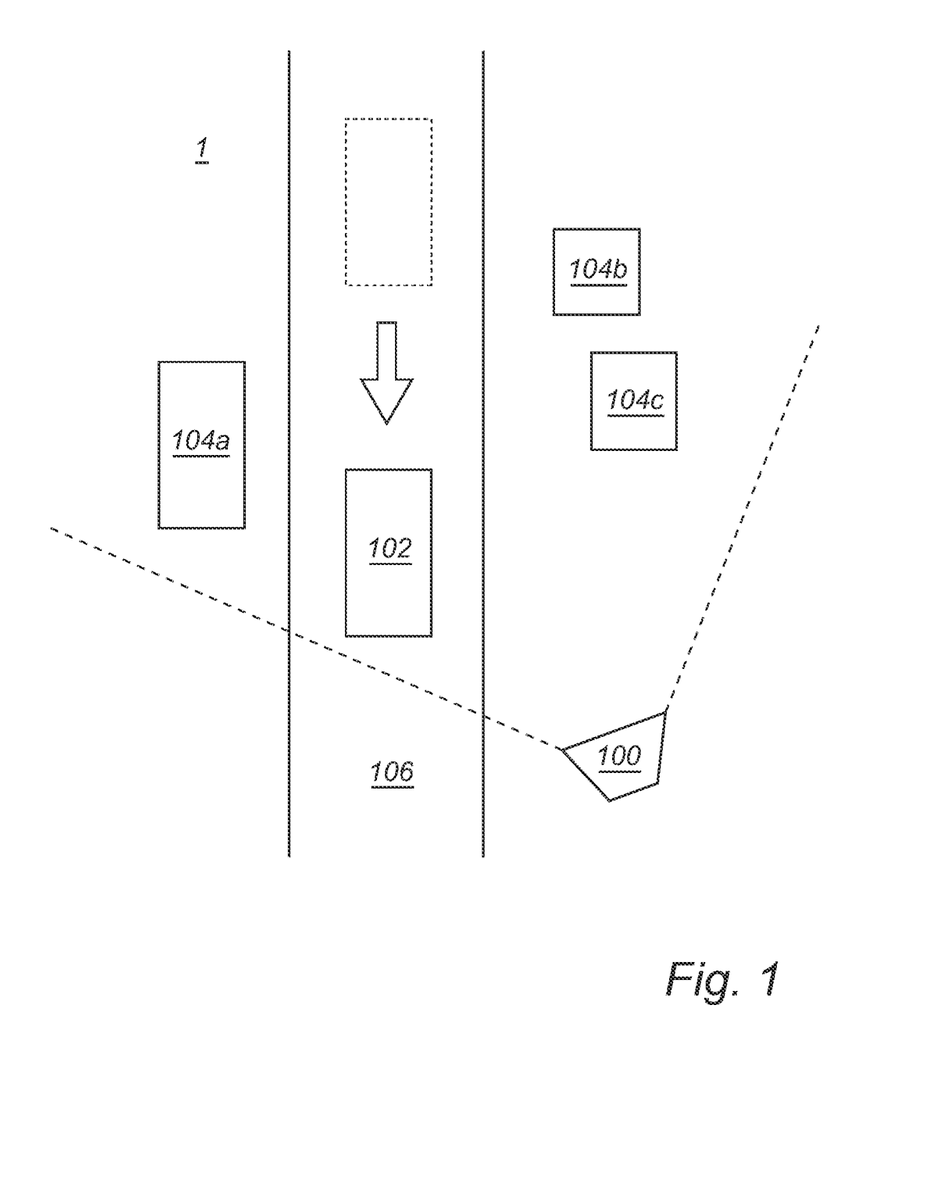
FIG. 1 conceptually illustrates a scene being monitored by an image capturing device as an example application of certain embodiments.

Turning now to the drawings and to FIG. 1 in particular, there is shown a scene 1 being monitored by an image capturing device 100, e.g., a camera or more specifically a surveillance camera. In the scene 1, there is a moving object 102 and a set of static objects 104a, 104b, and 104c. The moving object 102 may be vehicle driving on a road 106 and at least one of the static objects, e.g., 104a is a vehicle that is parked next to the road 106.

The image capturing device 100 is continuously monitoring the scene 1 by capturing a video stream of the scene and the objects therein. Some objects, such as a vehicle 104a, and in particular their license plates, are desirable to mask so that they are not visible in the output video stream. For this, it is necessary to detect objects in the scene and classifying them to be of a specific type, e.g., a vehicle, so that they can be masked.

Detecting and classifying a static object ensues different challenges compared to classifying moving objects. A fast-moving object 102 may be difficult to accurately detect and classify because it only stays in the scene 1 for a limited period of time. To alleviate this problem, the system conducts classifications with different properties depending on whether the background of static objects is considered or if the foreground of moving objects are considered.

Figure 2:
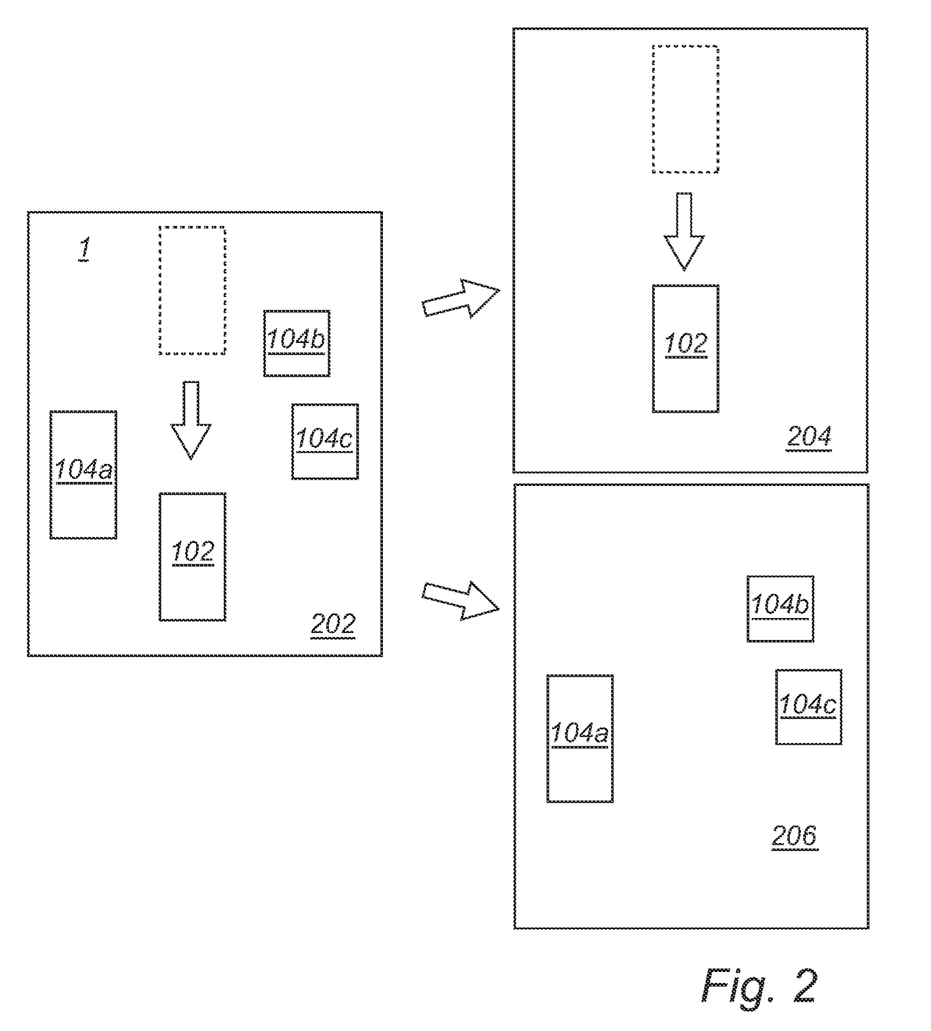
FIG. 2 conceptually illustrates segmentation into background and foreground segments according to certain embodiments.

Turning to FIG. 2, the scene 1 is represented by an example accumulation of two or more frames 202 where the moving object 102 has moved. Each frame of the video stream is split or segmented into a foreground 204 indicative of the moving object, e.g., the vehicle 102, and into a background 206 indicative of the static objects 104a-c.

Segmentation into foreground and background may be performed by e.g., analyzing the evaluation of the captured scene in the video stream and if movement is detected between two frames, the relevant regions of the frames are tagged as foreground. Regions of the frames where no movement is detected are tagged as background. Segmentation may be performed in various ways and can generally be performed based on many features related to images, such as color, intensity, region-based segmentation. Some examples are now only briefly described.

For example, segmentation may be based on motion vectors, where areas in the frames of the video stream with motion-vectors with magnitudes larger than a certain magnitude fall into the foreground segment and remaining areas fall into the background segment.

Segmentation may be based on pixel value difference, e.g., differences in pixel intensity and color may be used for segmentation.

Figure 3:
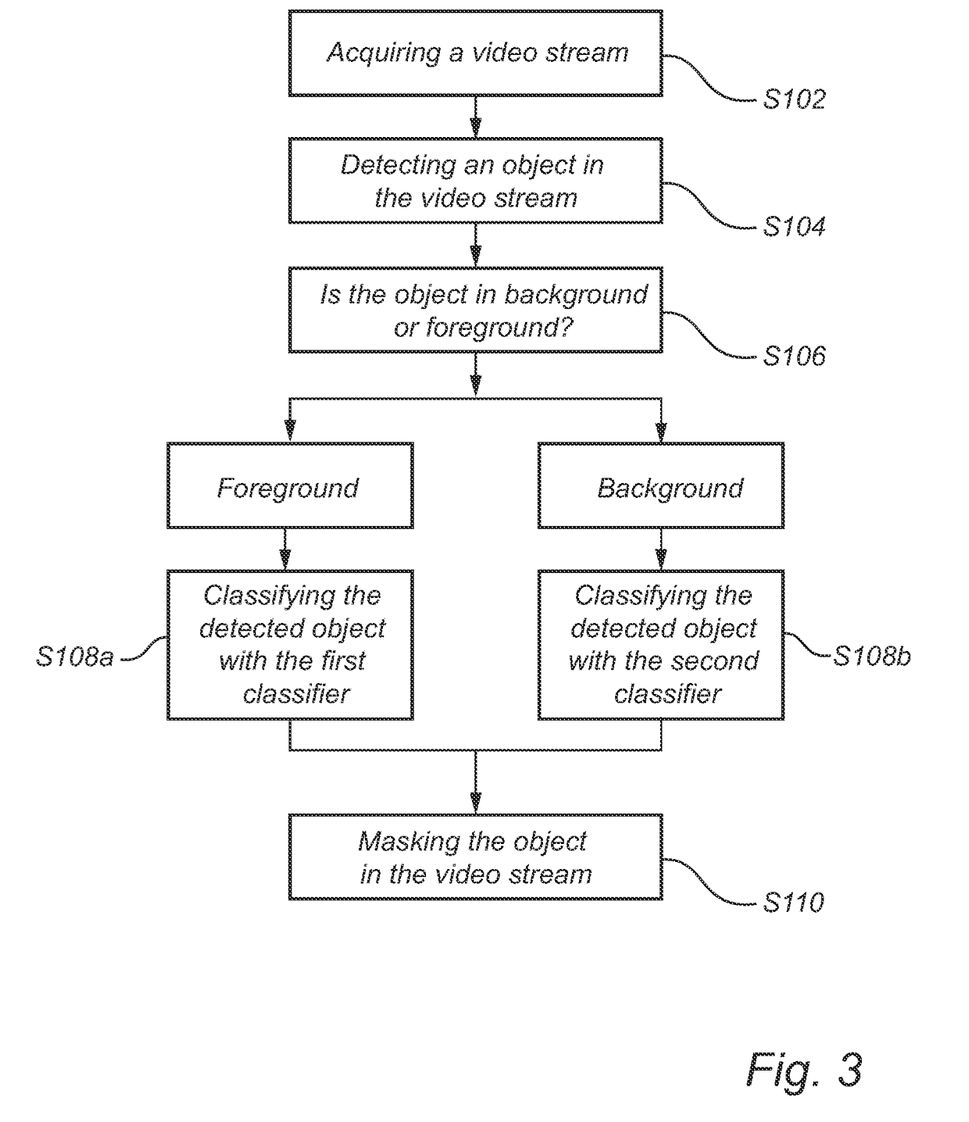
FIG. 3 is a flow-chart of method steps according to certain.

FIG. 3 is a flow-chart of method steps according to a first for detecting, classifying and masking of objects in a video stream.

In step S102 a video stream is acquired. This may be performed by the image capturing device 100, in other words, the image capturing device acquires a video stream of the scene 1 comprising moving 102 and static objects 104a-c.

In step S104 the moving object 102, and objects 104a-c is detected in the video stream. This detection may be performed prior to or subsequent to a segmentation or splitting of the video stream 202 into the background 206 and the foreground 204.

In step S106 it is determined whether the detected object belongs to a foreground 204 of the video stream 202 indicative of moving objects 102 or a background 206 of the video stream 202 indicative of static objects 104a-c. Such determination may be performed by evaluating whether the objects moves or not. A moving object 102 generally belongs to the foreground and a static object 104a-c belongs to the background. However, it should be noted that the terms "foreground" and "background" are used only for convenience. Other terms may be applied, such as first and second groups, static and mobile groups, or fast-moving and slow-moving groups.

Further, the video stream may be segmented into a background and a foreground, wherein, after the segmentation, the object is determined to belong to the background or to the foreground. Thus, the video stream may be split into the background 206 and into the foreground 204, and, depending in which segment, the background 206 or foreground 204, the object is detected, it can be concluded whether the object belongs to the background 206 or to the foreground 204.

In steps S108a-b, the detected object is classified to be of a specific type using a first classifier, step S108a, if the detected object is determined to belong to the foreground, and using a second classifier, step S108b, if the detected object is determined to belong to the background. The first classifier is different from the second classifier.

The specific type may be that the object is a vehicle such as e.g., a car, a truck, a boat, a motorcycle. The specific type may additionally or alternatively be that the object is a person.

The difference between the classifiers may be of different nature, however, with the main (though not only) objective that the first classifier should classify moving objects and the second classifier should classify static objects.

In step S110, if the detected object in either one of the foreground or background is classified as being of the specific type of object the object is masked in the video stream. Thus, in the output video stream, objects classified as being of the specific type are masked. For example, if the object 104a is classified as vehicle by the second classifier, the vehicle 104a is masked in step S110, and if the moving object 102 is classified as vehicle by the first classifier, the vehicle 102 is masked in step S110.

The first classifier is different from the second classifier. For example, the computational complexity of the first classifier is lower than the computational complexity of the second classifier. This provides the advantage that the first classifier may process the data from the video stream faster such that moving objects can be classified at the cost of less accurate classifications.

Figure 4:
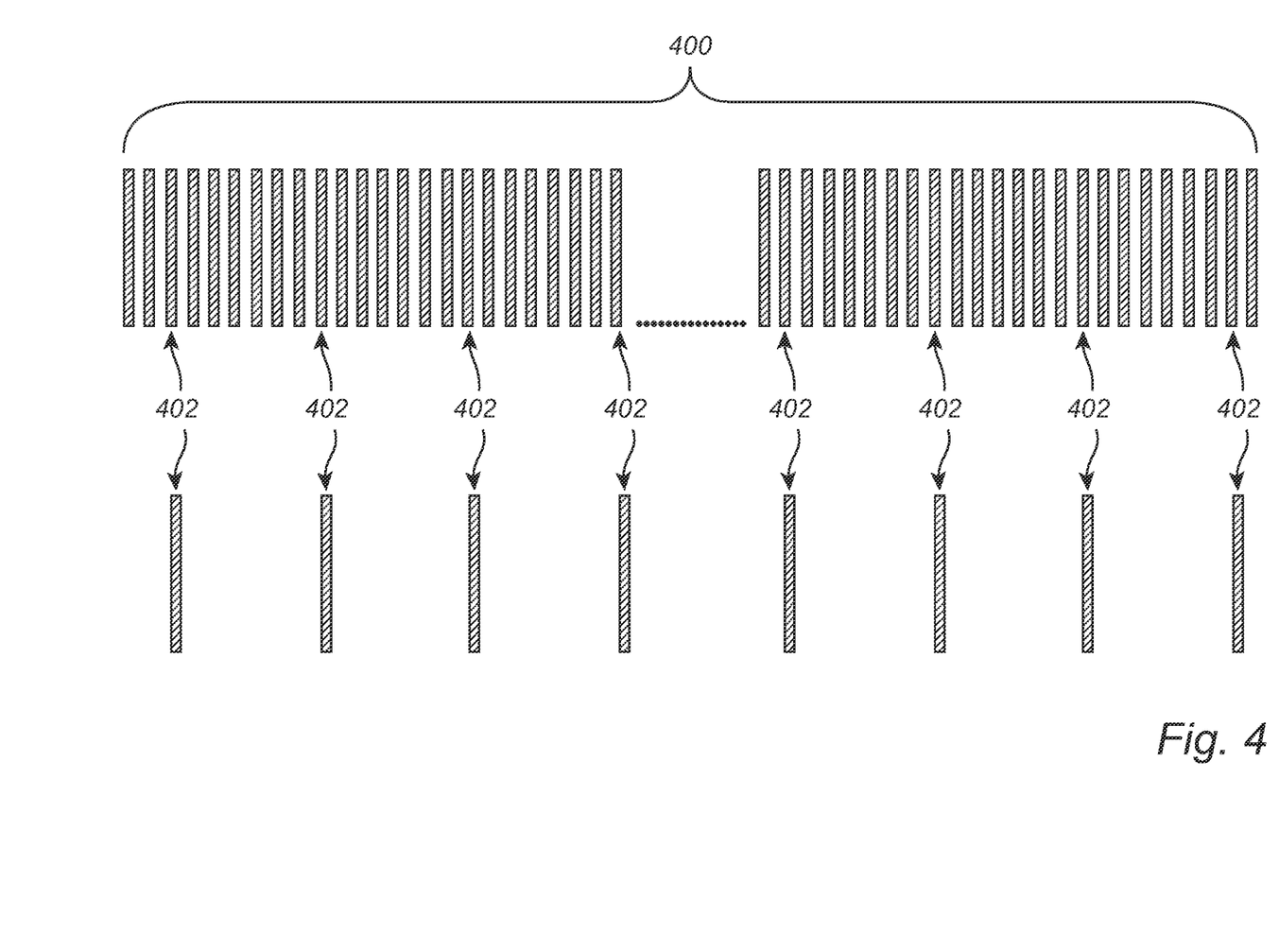
FIG. 4 conceptually illustrates a stream of frames of a video stream.

The video stream is a stream of frames, as is often the case in video processing. FIG. 4 conceptually illustrates a video stream as conceptual consecutive frames 400. To take advantage of the different requirements of the classifiers, the second classifier may be configured to perform classification on fewer frames per time unit of the video stream than that of the of the first classifier. For example, the second classifier may be configured to perform classification only on nonconsecutive time frames 402 of the video stream. In other words, objects in the background 206 is classified only in nonconsecutive time frames 402 whereas objects in the foreground are classified using the full set of frames 400. The nonconsecutive times frames 402 occur at regular time intervals separated by a fixed time duration or separated by a fixed number of intermediate time frames such as the nonconsecutive times frames 402 are for example every $5^{th}$, $10^{th}$, $15^{th}$, $20^{th}$, or $25^{th}$ time frame.

Since the second classifier is expected to classify only static objects, there is no need for high temporal density data, e.g., the full set of frames 400. In contrast, since the first classifier is expected to classify moving objects, it is advantageous to use video data with higher temporal density, such as the full set of frames 400, than for the second classifier where only nonconsecutive times frames 402 are sufficient.

Further, the first classifier may be specifically configured to classify moving objects and the second classifier may be specifically configured to classify static objects. For example, the first classifier may have been trained using image data of moving objects whereas the second classifier may have been trained using image data of static objects.

Figure 5:
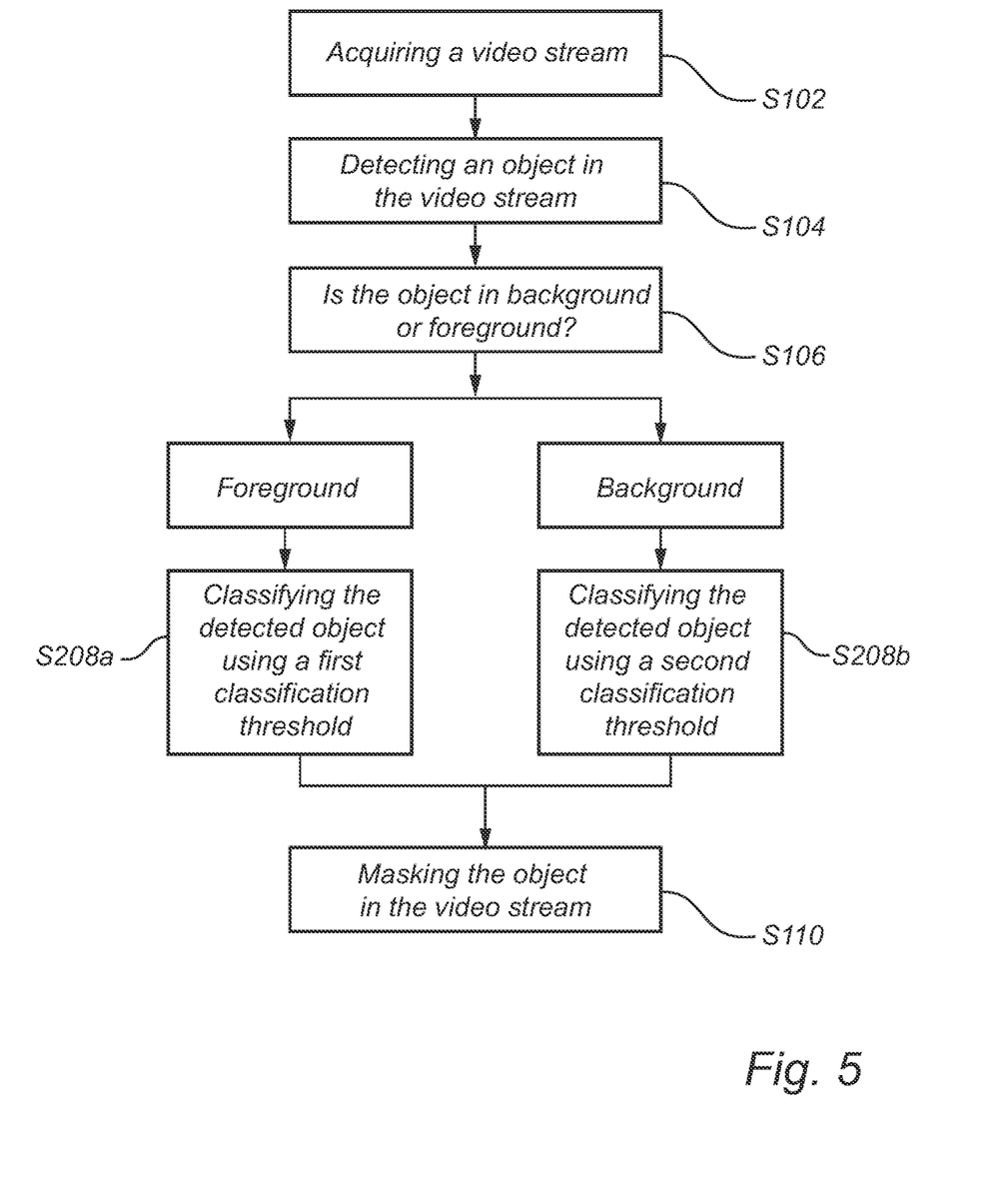
FIG. 5 is a flow-chart of method steps according to certain embodiments.

FIG. 5 is a flow-chart of method steps according to a second aspect for detecting, classifying and masking of objects in a video stream. The method of this second aspect is based on the same insight as that of the first aspect described with reference to FIG. 3 and thus belong to the same concept.

In step S102 a video stream is acquired. This may be performed by the image capturing device 100, in other words, the image capturing device acquires a video stream of the scene 1 comprising moving 102 and static objects 104a-c. Step S102 of FIG. 5 is performed in the same way as step S102 of FIG. 3.

In step S104 a moving object 102, and objects 104a-c is detected in the video stream. This detection may be performed prior to or subsequent to a segmentation or splitting of the video stream 202 into the background 206 and the foreground 204.

In step S106 it is determined whether the detected object belongs to a foreground 204 of the video stream 202 indicative of moving objects 102 or a background 206 of the video stream 202 indicative of static objects 104a-c. Such determination may be performed by evaluating whether the objects moves or not. A moving object generally belongs to the foreground and a static object belongs to the background. Step S106 of FIG. 5 is performed in the same way as step S106 of FIG. 3.[JH1]

In step S208a-b, the detected object is classified to be of a specific type using a lower, first classification threshold if the detected object is determined to belong to the foreground, step S208a, than if the object is determined to belong to the background, step S208b, where a second classification threshold is used. The first classification threshold is lower than the second classification threshold.

In step S110, if the detected object in either one of the foreground or background is classified as being of the specific type of object the object is masked in the video stream. Thus, in the output video stream, objects classified as being of the specific type are masked. For example, if the object 104a is classified as vehicle using the second classification threshold, the vehicle 104a is masked in step S110, and if the moving object 102 is classified as vehicle using the first classification threshold, the vehicle 102 is masked in step S110. Step S110 of FIG. 5 is performed in the same way as step S110 of FIG. 3.

A moving object 102 is more difficult, or computationally costly, to detect and classify. Therefore, the first classification threshold for a detected object to be of a specific type in the foreground 204 is set relatively low. An object 104a-c that is not moving is easier to detect and classify. Therefore, a relatively high classification threshold can be used that a detected object is of a specific type if the object is known to be static. Based on this insight, the first classification threshold used in the foreground 204 is lower than the second classification threshold used in the background 206 of the video stream.

Figure 6:
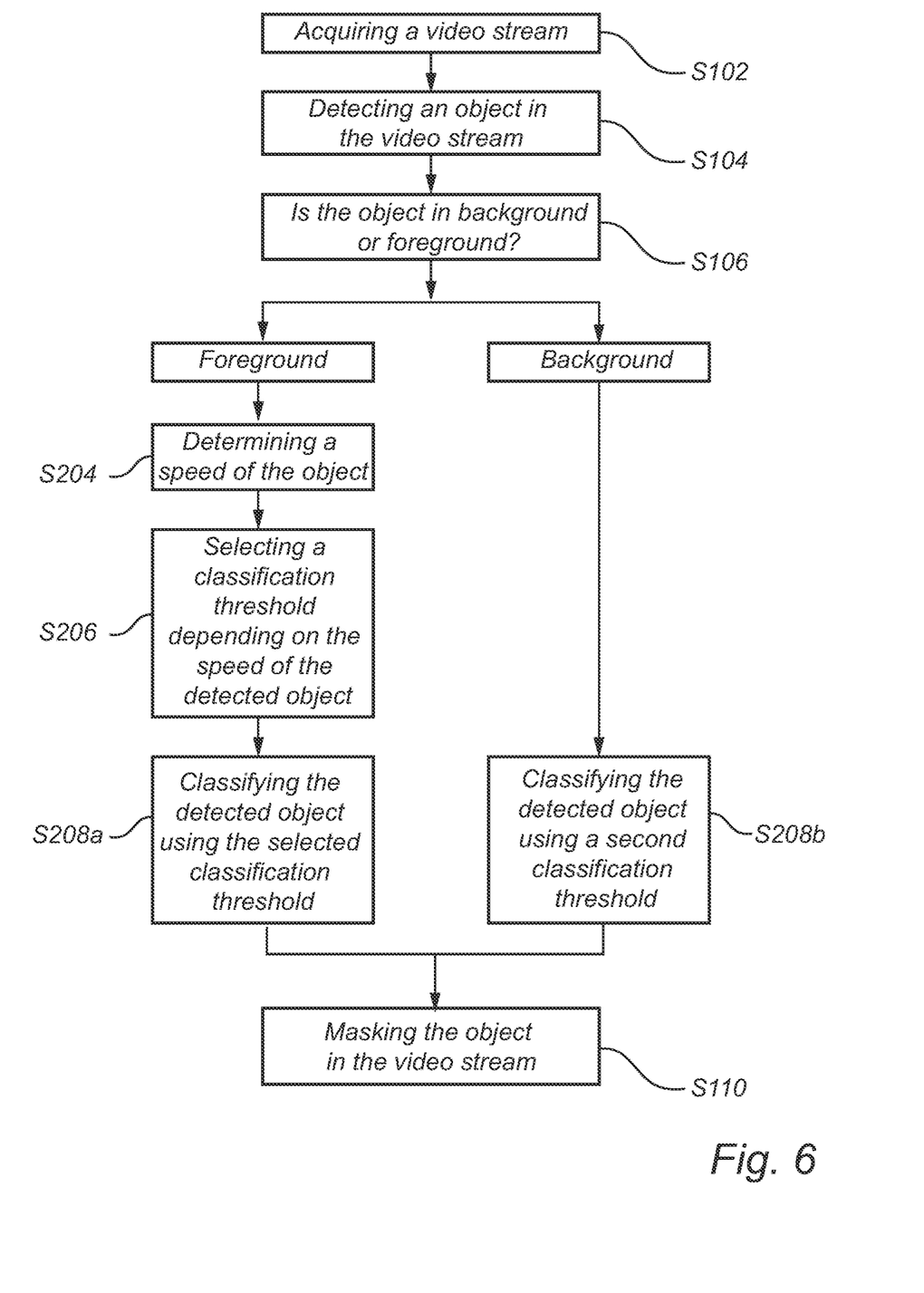
FIG. 6 is a flow-chart of method steps according to certain embodiments.

With reference to FIG. 6, if the detected object is determined to belong to the foreground in step S106, the speed of the detected object is determined in step S204. The speed of the object may be determined by analyzing consecutive frames in the video stream or by other known means in the art.

In step S206 is a classification threshold selected depending on the speed of the detected object. The detected object is classified using the selected classification threshold in step S208a as discussed in relation to FIG. 5.

Figure 7:
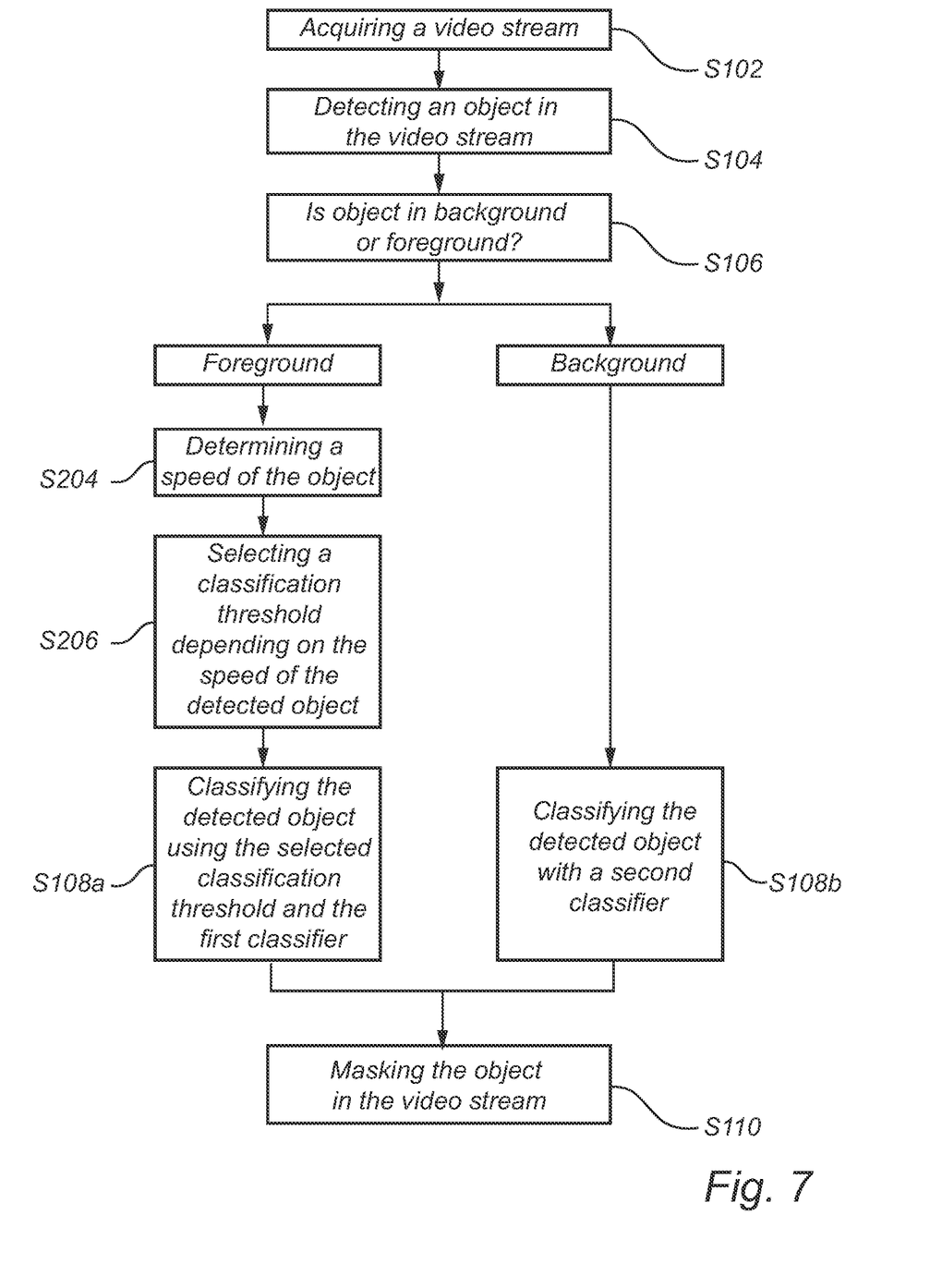
FIG. 7 is a flow-chart of method steps according to certain embodiments.

Similarly, in the case of different classifiers described with reference to FIG. 3, and now with reference to FIG. 7, if the detected object is determined to belong to the foreground in step S106, the speed of the detected object is determined in step S204.

The speed of the object may be determined by analyzing consecutive frames in the video stream or by other known means in the art.

In step S206 a classification threshold is selected depending on the speed of the detected object. The detected object is classified in step S108a using the selected classification threshold and the first classifier as discussed in relation to FIG. 3.

The classification threshold may be set and tuned depending on the application at hand. It may for example be possible to use a fixed threshold, thus, if the speed of the moving object 102 exceeds a speed threshold, the object is classified using a classifier with the first classification threshold. However, if the speed of the moving object 102 is below the speed threshold, the object is classified using the classifier with a second classification threshold that is higher than the first classification threshold.

In some possible implementations, a speed exceeding the speed threshold indicates that the object 102 is moving and a speed below the speed threshold indicates a static object 104a-c.

The classification threshold may be a function of the object speed, a so-called sliding threshold. Thus, a predetermined function may be used where the object speed is used as input, and the output is the selected classification threshold. For example, a change in object speed may result in a proportional change in selected classification threshold.

All objects classified as being of the specific type, such as a vehicle comprising a license plate, whether being in the foreground set of frames or in the background set of frames, are masked.

The classifiers discussed herein may operate different types of classifiers. For example, a classifier neural network may be used that is adapted to perform the classifying step. Various types of neural networks adapted to perform classification is conceivable and known per se. Example suitable neural networks are convolutional neural networks, that may or may not have recursive features. Other suitable classifiers may be decision tree classifiers such as random forest classifiers. In addition, classifiers such as support vector machine classifiers, logistic regression classifiers, heuristic classifiers, fuzzy logic classifiers, statistical classifiers, or look-up tables are also conceivable to be used in the classifier.

The classifier provides an output indicating the outcome of the classifying step, for example whether an object is of the specific type with some probability provided by the classification threshold.

The classification thresholds may tuneable to a specific classifier. The classification thresholds may be empirically determined threshold values.

Figure 8:
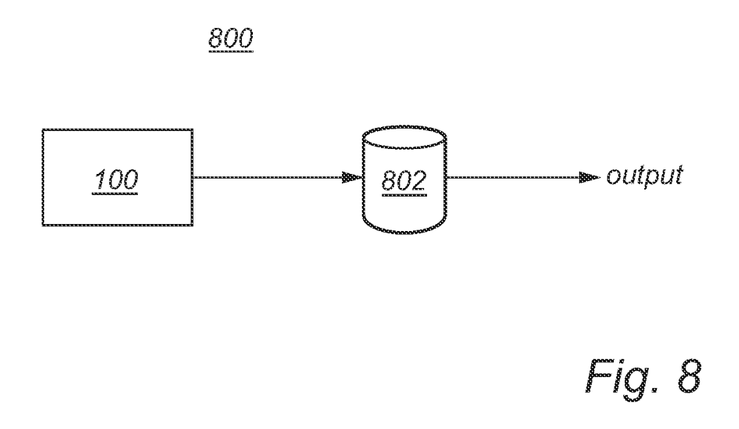
FIG. 8 is a block diagram of system according to certain.

FIG. 8 is a block-diagram of a system 800 according to certain embodiments. The system 800 comprising an image capturing device 100 configured to capture a video stream, and a control unit 802 configured to perform any one of the methods described in relation to FIGS. 3-7. The output being the video stream with the objects of the specific type masked.

The control unit includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the concepts have described with reference to specific exemplifying embodiments thereof, many different alterations, modifications and the like will become apparent for those skilled in the art.

In addition, variations to the disclosed embodiments can be understood and effected by the skilled addressee in practicing the concepts, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for masking of objects in a video stream, the method comprising:
   acquiring a video stream;
   detecting objects in the video stream;
   determining that one detected object belongs to a foreground of the video stream indicative of moving objects and that one detected object belongs to a background of the video stream indicative of static objects;
   classifying the detected object that belongs to the foreground to be of a specific type using a first classifier, and classifying the detected object that belong to the background to be of the specific type using a second classifier, the first classifier being configured to classify moving objects of the specific type and the second classifier being configured to classify static objects of the same specific type as the first classifier,
   determining that the detected objects in the background and in the foreground are classified as being of the specific type of object, and
   masking only the objects classified to be of the specific type in the foreground and in the background of the video stream.

2. The method according to claim 1, wherein the computational complexity of the first classifier is lower than the computational complexity of the second classifier such that the first classifier process data from the video stream faster and with less accuracy than the second classifier.

3. The method according to any one of claim 1, the second classifier being configured to perform classification on fewer frames per time unit of the video stream than that of the first classifier.

4. The method according to claim 1, the second classifier being configured to perform classification only on nonconsecutive time frames of the video stream.

5. The method according to claim 1, comprising:
if the detected object is determined to belong to the foreground, determining the speed of the detected object; and
selecting a classification threshold depending on the speed of the detected object, and wherein the detected object is classified using the selected classification threshold, wherein, if the speed of the object exceeds a speed threshold, classifying the object using a classifier with a first classification threshold, and if the speed of the object is below the speed threshold, classifying the object using the classifier with a second classification threshold that is higher than the first classification threshold.

6. The method according to claim 5, wherein a speed exceeding the speed threshold indicates that the object is moving and a speed below the speed threshold indicates a static object.

7. The method according to claim 5, wherein the classification threshold is a function of the object speed.

8. The method according to claim 1, comprising classifying objects in the foreground set of frames and in the background set of frames, and masking each object classified as being of the specific type of object.

9. The method according to claim 1, comprising:
segmenting the video stream into a background and a foreground, wherein, subsequent to the segmentation, the object is determined to belong to the background or to the foreground.

10. The method according to claim 1, the specific type of object being a vehicle.

11. A method for masking of objects in a video stream, the method comprising:
acquiring a video stream;
detecting objects in the video stream;
determining that one detected object belongs to a first portion of the video stream indicative of moving objects and that one object belongs to a second portion of the video stream indicative of static objects;
classifying the detected object that belongs to the first portion to be of a specific type, and classifying the detected object that belongs to the second portion to be of the specific type, wherein classifying the detected object that belongs to the first portion is performed using a lower classification threshold than the classification threshold used for the detected object determined to belong to the second portion,
determining that the detected objects in the first potion and in the second portion are classified as being of the specific type of object, and
masking only the objects classified to be of the specific type in the first potion and in the second portion of the video stream.

12. The method according to claim 11, comprising:
if the detected object is determined to belong to the first portion, determining the speed of the detected object; and
selecting a classification threshold depending on the speed of the detected object, and wherein the detected object is classified using the selected classification threshold, wherein, if the speed of the object exceeds a speed threshold, classifying the object using a classifier with a first classification threshold, and if the speed of the object is below the speed threshold, classifying the object using the classifier with a second classification threshold that is higher than the first classification threshold.

13. The method according to claim 11, wherein a speed exceeding the speed threshold indicates that the object is moving and a speed below the speed threshold indicates a static object.

14. The method according to claim 11, wherein the classification threshold is a function of the object speed.

15. The method according to claim 11, comprising classifying objects in the first portion set of frames and in the second portion set of frames, and masking each object classified as being of the specific type of object.

16. The method according to claim 11, comprising:
segmenting the video stream into a second portion and a first portion, wherein, subsequent to the segmentation, the object is determined to belong to the second portion or to the first portion.

17. A non-transitory computer-readable storage medium having stored thereon instructions for implementing a method for masking of objects in a video stream, when executed on a device having processing capabilities, the method comprising:
acquiring a video stream;
detecting objects in the video stream;
determining that one detected object belongs to a foreground of the video stream indicative of moving objects and that one detected object belongs to a background of the video stream indicative of static objects;
classifying the detected object that belongs to the foreground to be of a specific type using a first classifier, and classifying the detected object that belongs to the background using a second classifier, the first classifier being configured to classify moving objects of the specific type and the second classifier being configured to classify static objects of the same specific type as the first classifier,
determining that the detected objects in the background and in the foreground are classified as being of the specific type of object, and,
masking the objects classified to be of the specific type in the foreground and in the background of the video stream.

18. A non-transitory computer-readable storage medium having stored thereon instructions for implementing a method for masking of objects in a video stream, when executed on a device having processing capabilities, the method comprising:
acquiring a video stream;
detecting an object in the video stream;
determining that one detected object belongs to a first portion of the video stream indicative of moving objects and that one object belongs to a second portion of the video stream indicative of static objects;
classifying the detected object that belongs to the first portion to be of a specific type, and classifying the detected object that belongs to the second portion to be of the specific type, wherein classifying the detected object that belongs to the first portion is performed using a lower classification threshold than the classification threshold used for the detected object determined to belong to the second portion,
determining that the detected objects in the first potion and in the second portion are classified as being of the specific type of object, and masking only the objects classified to be of the specific type in the first potion and in the second portion of the video stream.

\* \* \* \* \*